United States Patent
Subramanian et al.

(10) Patent No.: US 6,782,000 B2
(45) Date of Patent: Aug. 24, 2004

(54) METHOD, SYSTEM AND STORAGE MEDIUM FOR PROVIDING A CROSS CONNECT USER INTERFACE

(75) Inventors: Mahesh Subramanian, San Jose, CA (US); Suresh Muthu, San Jose, CA (US); Kuga P. Visagamani, San Jose, CA (US)

(73) Assignee: CIENA Corporation, Linthicum, MD (US)

( * ) Notice: Subject to any disclaimer, the term of this patent is extended or adjusted under 35 U.S.C. 154(b) by 105 days.

(21) Appl. No.: 10/284,667

(22) Filed: Oct. 31, 2002

(65) Prior Publication Data

US 2004/0095955 A1 May 20, 2004

(51) Int. Cl.[7] .......................... H04L 12/43; H04L 12/56
(52) U.S. Cl. ................... 370/458; 370/376; 370/395.1; 370/357
(58) Field of Search ................................ 370/354, 357, 370/358, 360, 369, 375, 376, 395.1, 458, 535, 412, 395.3; 359/341.1

(56) References Cited

U.S. PATENT DOCUMENTS

| | | | |
|---|---|---|---|
| 5,805,568 A | | 9/1998 | Shinbashi |
| 6,501,758 B1 | * | 12/2002 | Chen et al. ............... 370/395.1 |
| 6,584,121 B1 | * | 6/2003 | Garg et al. ................. 370/474 |
| 6,667,973 B1 | * | 12/2003 | Gorshe et al. .............. 370/376 |

* cited by examiner

*Primary Examiner*—Afsar Qureshi
(74) *Attorney, Agent, or Firm*—Michael R. Cammarata; David A. Fox (57) ABSTRACT

A user interface for managing connections in a communication network cross connect. The user interface provides for creation, viewing and removing connections in the cross connect. When displaying connections, a slice value and granularity may be adjusted to allow for effective viewing of connections having high data rates. The user interface may include a search tool for locating connections and/or a protection setup routine to facilitate establish protection connections.

32 Claims, 9 Drawing Sheets

METHOD, SYSTEM AND STORAGE MEDIUM FOR PROVIDING A CROSS CONNECT USER INTERFACE

BACKGROUND OF THE INVENTION

1. Field of Invention

The invention relates generally to user interfaces and in particular to a user interface for interacting with a network cross connect.

2. Description of Related Art

Optical communication networks utilize a variety of network elements to transmit information from sender to receiver. One such network element is a cross connect which essentially serves as a switch for establishing paths along the network. Through a user interface, the cross connect allows a user to create connections, analyze connections and remove connections.

Existing user interfaces for cross connects have not adjusted to the rapid increase in cross connect size. Existing cross connects may implement multiple ports carrying data at a OC-192 level (i.e., 192 time slots). For a 16 port cross-connect, this results in a switch fabric of 3072 time slots by 3072 time slots, with sizes expected to increase. Conventional cross connect user interfaces are not designed to efficiently display such a high number of time slots collectively or per port.

BRIEF DESCRIPTION OF THE DRAWINGS

Embodiments of the present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of embodiments of the invention refers to the accompanying drawings. The same reference numbers in different drawings identify the same or similar elements. Also, the following detailed description does not limit the invention. Instead, the scope of the invention is defined by the appended claims and equivalents thereof.

The invention may be used in a variety of communication networks, including electrical and optical networks. The expression "communicates" as used herein refers to any connection, coupling, link or the like by which signals carried by one system element are imparted to the "communicating" element. Such "communicating" devices are not necessarily directly connected to one another and may be separated by intermediate components or devices. Likewise, the expressions "connected" and "coupled" as used herein are relative terms and do not require a direct physical connection.

Figure 1:
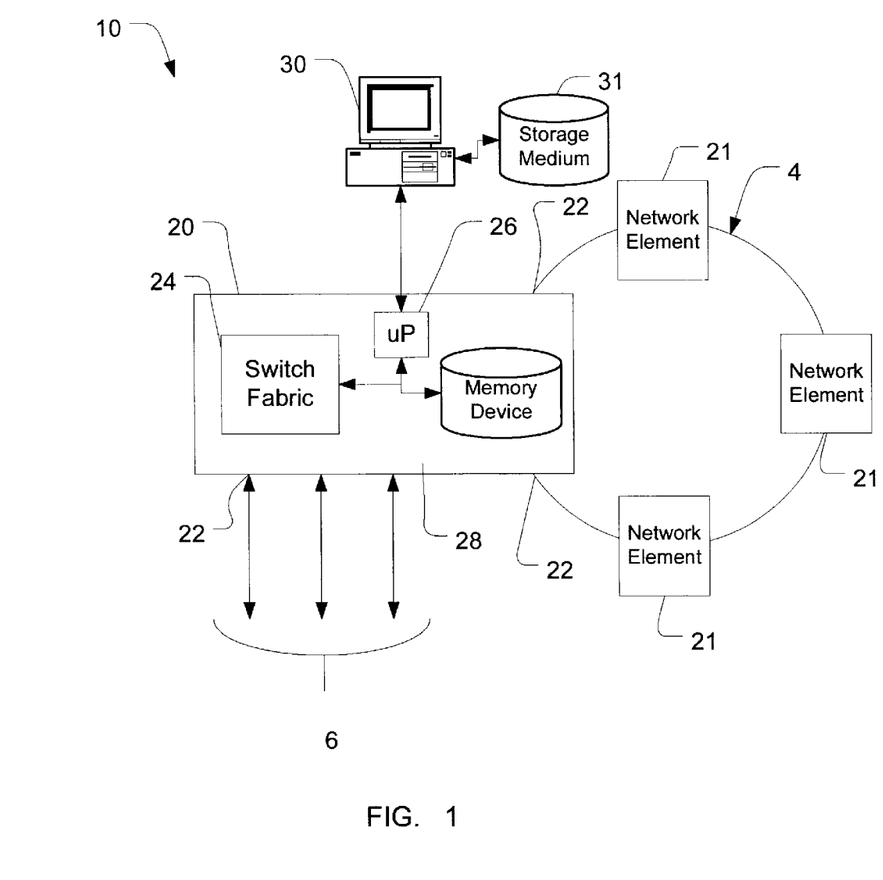
FIG. 1 is a block diagram of an exemplary communication network.

FIG. 1 is a block diagram of an exemplary communication network 10 including a cross connect 20 having a number of ports 22 for receiving signals and directing signals to other ports through a switch fabric 24. A processor 26 is used to control the switch fabric and a memory device 28 stores cross connect configuration data concerning equipment in the cross connect 20 and connections between ports as described in further detail herein. In the example shown in FIG. 1, the cross connect 20 carries traffic around network ring 4 referred to as line connections. The ring includes network elements 21 that may be devices such as optical amplifiers, OADMs, other cross connects, etc.

The cross connect 20 may also provide for adding or dropping connections (e.g., include an add/drop multiplexer) to and from the network ring 4 referred to as tributary connections 6. Furthermore, cross connect 20 may provide cross connections between segments of a linear network, between different network rings, and may even be part of a mesh network and cross connect multiple network segments and otherwise serve as an N-degree node. In other words, cross connect 20 and the cross connections displayed by the invention are not limited to the ring cross connects illustrated in the example of FIG. 1.

An embodiment of the invention is a user interface that allows a user to create, view and remove connections in cross connect 20. The user interface may be implemented by a user interface application executed by a user system 30 coupled to the cross connect 20 through processor 26. The user system 30 may be a general-purpose computer executing the user interface application stored in a storage medium 31 accessible by user system 30. The user system 30 includes suitable input devices (e.g., keyboard, mouse) and a graphical display device (e.g., CRT).

User system 30 may be a craft terminal that connects directly to the cross connect 20 (e.g., RS232 connection). Alternatively, the user system 30 may access cross connect 20 over one or more networks such as an overlay IP network, an optical service channel of network 10, in-band signaling techniques such as DCC or other SONET/SDH overhead bytes, etc. Thus, the user system 30 may interface with more than one cross connect 20 at a time. When the user system 30 contacts cross connect 20, the contents of storage medium 31 may be synchronized with memory device 28 using conventional database synchronization techniques. This allows the user system 30 to perform display and search operations without accessing cross connect 20 for each such function.

The user system 30 executes a user interface application that allows a user to create, view and remove connections in cross connect 20. The user interface application uses a layered display process to effectively display connections for cross connects having a large number of connections. In an embodiment of the invention, cross connect 20 includes 16 ports and is designed for switching time division multiplexed signals having up to 192 time slots (e.g., STS-192, SDH-192). With 16 ports and 192 time slots per port, this results in a switch fabric of 3072 by 3072. The use of the layered display process allows the user to manage this large amount of connections.

Figure 2:
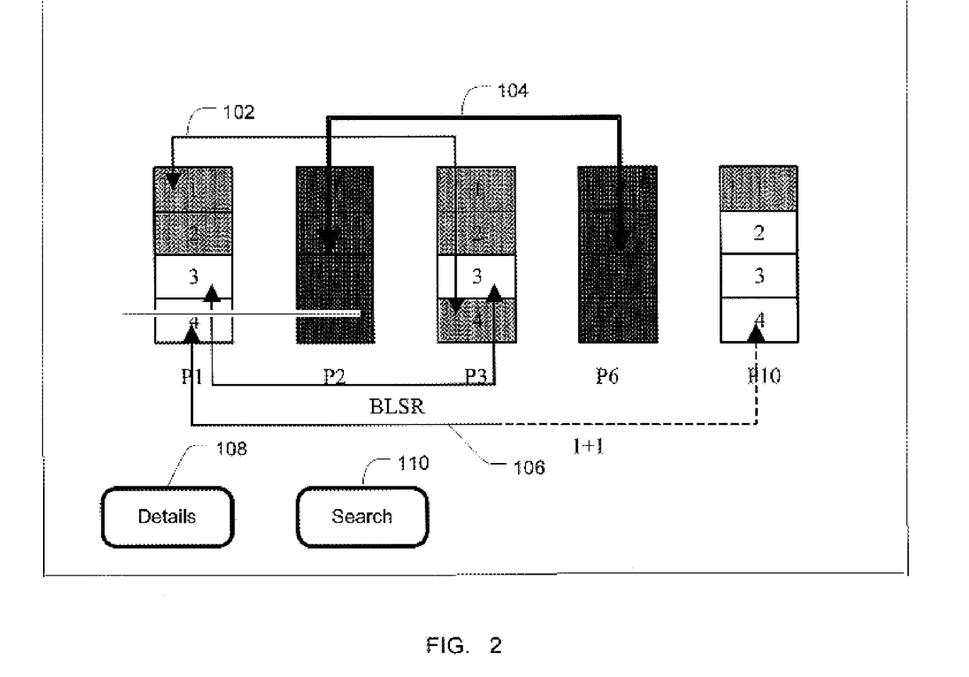
FIG. 2 depicts an exemplary user interface at a first level.

FIG. 2 is an exemplary user interface generated at user system 30 showing cross connections at a first, coarse level.

Prior to generating the user interface, user system 30 determines a slice value and a granularity in order to display connection information to the user. The slice value controls the portion of the timeslots to be displayed at one time. The granularity controls the resolution with which the time slots are represented. In the example shown in FIG. 2, the slice value is 192 meaning that information concerning 192 time slots is presented. The granularity is 48 meaning that the time slots are represented in blocks of 48.

The user system 30 may automatically determine the slice value and granularity by communicating with cross connect 20. The user system 30 determines the type of cross connect 20 by communicating with processor 26. A database in storage medium 31 may store cross connect configuration data such as equipment type, equipment operation mode, number of ports, port data rates and a list of all connections in the cross connect 20. As described previously, the storage medium 31 may obtain the cross connect configuration data from memory device 28.

Based on the connections formed by cross connect 20, the user system 30 sets the slice value and granularity accordingly. For example, for a cross connect operational at STS-48 or below, all time slots can be shown in a single display. Thus, the slice value would be set to 48 and the granularity set to 1.

Alternatively, the user may be given the opportunity to set the slice value and the granularity. For example, the user may be presented with a dialog box and asked to provide the slice value and the granularity for the coarse display level.

FIG. 2 depicts an exemplary coarse display depicting all ports having a provisioned connection, in this example ports P1, P2, P3, P6 and P10. Each port is represented by a number of sub-ports labeled 1–4. The size of the sub-port is determined by the granularity. In the example in FIG. 2, the granularity is set to 48, with each port carrying up to 192 time slots resulting in 4 sub-ports displayed per port.

Time slots corresponding to connections are identified through indicia such as shading or coloring. Connections between the ports are represented by connection lines. Connection line 102 represents an STS-48 connection between time slots 1–48 of port P1 and time slots 144–192 of port P3. Connection line 104 represents an STS-192 connection between time slots 1–192 of port P2 and time slots 1–192 of port P6.

The connection lines may be represented using different formats depending on the rate of the connection. In the example shown in FIG. 2, connection line 102 is thinner than connection line 104 to represent that connection line 102 has a lower data rate that connection line 104. The difference in data rate may be represented by formats other than line weight (e.g., color, line pattern).

Protection connections may also be represented in the user interface. Connection line 106 includes a first portion that is solid and a second portion that is dashed. The dashed representation indicates that time slots 1 thru 192 i.e the port P10 provide a protection path for time slots 1 thru 192 i.e the port P1 . This working/protection path may be represented using other techniques such as color.

To view more detail of cross connections, the user can select a number of sub-ports (e.g., up to four) and choose the details icon 108. A search icon 110 allows the user to search for connections as described in further detail herein.

Figure 3:
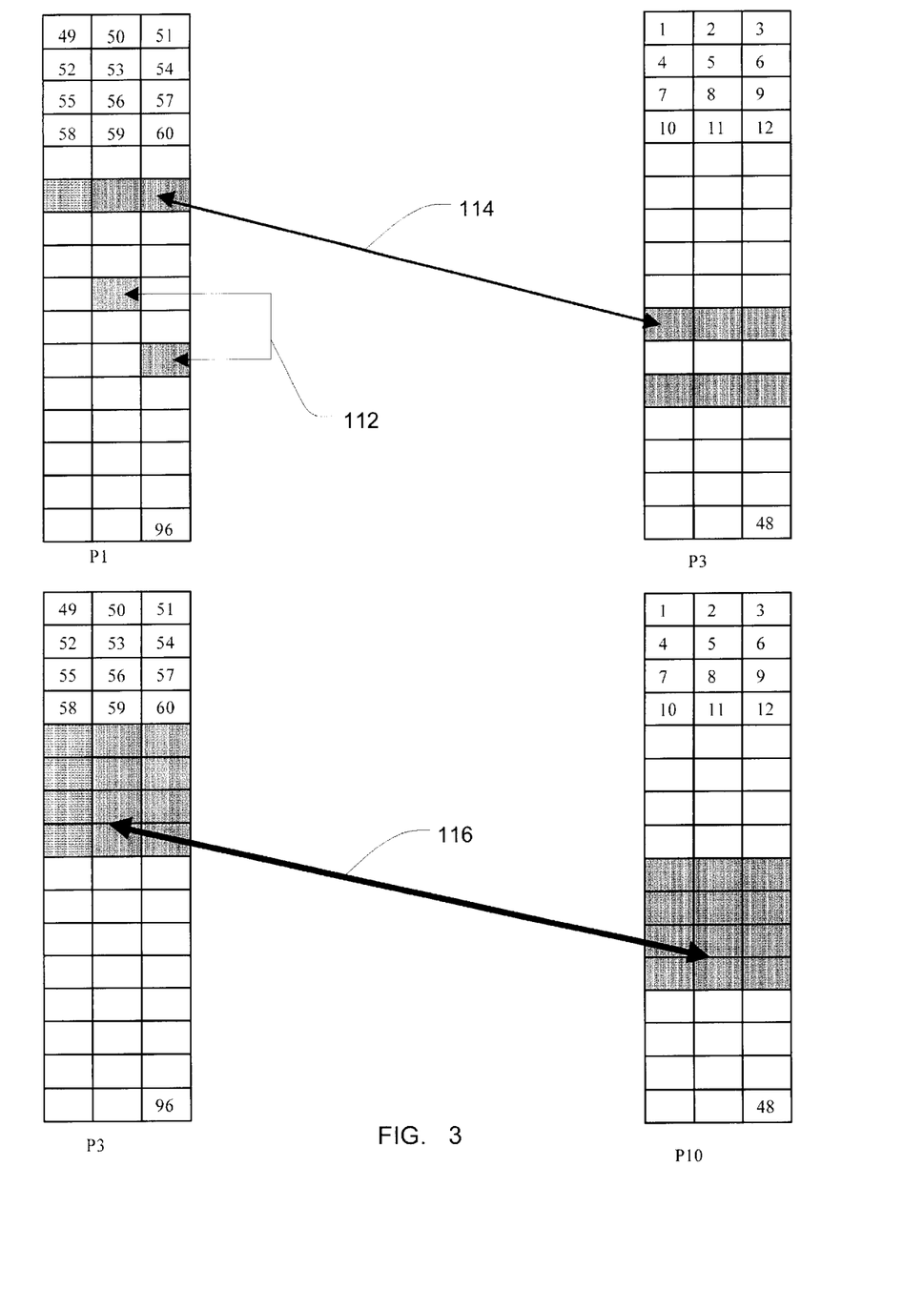
FIG. 3 depicts an exemplary user interface at a second level.

Once one or more sub-ports have been selected and the details icon selected, the user system 30 shows connections at a second, fine level such as that show in FIG. 3. In FIG. 3, the user system 30 automatically adjusts the slice value to 48 and the granularity to 1. This means that a section of 48 time slots of a port is shown with individual time slots depicted.

Connections in FIG. 3 are shown in a manner similar to that shown in FIG. 2. Connection lines depict time slot allocations between ports. Time slots associated with connections are represented using indicia such as shading or color. Connection lines also depict connections between ports. For example, connection line 112 shows an STS-1 (i.e., one time slot used) connection between two time slots in port P1. Connection line 114 shows an STS-3 (i.e., three time slots used) connection between ports P1 and P3. Connection line 116 shows an STS-12 (i.e., twelve time slots used) connection between ports P3 and P10. As noted previously, the format of the connection lines may be altered to represent the data rate by using line thickness, line color, etc.

Figure 4:
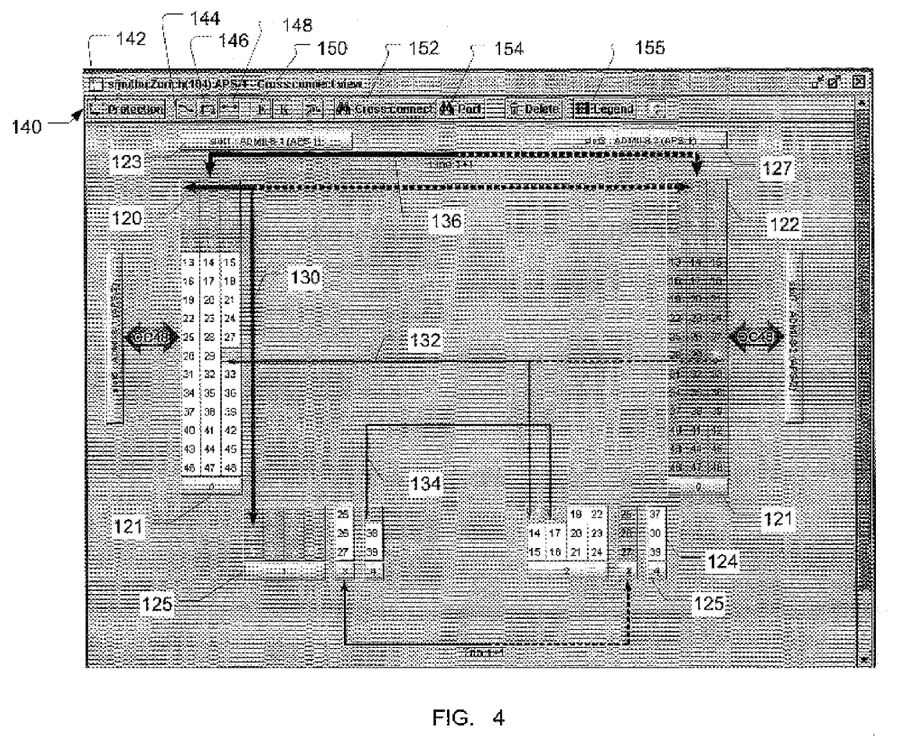
FIG. 4 depicts an exemplary user interface at the second level.

The ports illustrated in the user interface of FIG. 3 do not include any tributary connections such as for tributarys 6 of FIG. 1. FIG. 4 illustrates an exemplary user interface where one or more ports selected by the user includes tributary connection(s) such as tributary ports 1, 2, 3 and 4 shown at the bottom of FIG. 4 and including time slots 124 belonging to port 1. The user interface of FIG. 4 depicts line port time slots 120 and 122. Circuit pack indicators 123 and 127 are positioned above the line port time slots 120 and 122 and indicate the physical circuit pack or card providing the time slots. In the embodiment shown in FIG. 4, the circuit pack indicators 123 and 127 identify the slot in which the circuit pack providing the port is positioned. Tributary port time slots 124 are shown offset from the line port time slots.

As described above, line connections and tributary connections are represented by connection lines. Connection line 130 represents an STS-12 add/drop connection between time slots on line port 0 and time slots on tributary port 1. Connection line 130 also represents a protection connection (dotted line indicating protection) that protects the time slots 120 using time slots 122 on port 0 of another circuit. Connection line 132 represents an STS-1 connection between a time slot on port 0 and a time slot on port 2 along with a protection connection. Connection line 134 represents an STS-1 hairpin connection (i.e., from tributary port to tributary port) between a time slot on port 2 and a time slot on port 4.

FIG. 4 also depicts a line protection indicator 136 that indicates the protection scheme for line connections. As shown in FIG. 4, the line protection indicator 136 designates that time slots 1–48 of port 0 of the circuit pack in slot 1 are protected by time slots 1–48 of port 0 of circuit pack in slot 3. As described in further detail herein, once the protection scheme is designated, the user only needs to select line time slots and tributary time slots. The user system 30 then assigns the protection time slots automatically and updates the user interface accordingly.

The user interface of FIG. 4 depicts a toolbar 140 having a number of tool icons that allow a user to perform cross connect operations. The tool icons launch a variety of tools implemented by the user interface application.

To provide protection for one or more time slots in a line connection or a tributary connection, the user selects the relevant time slots and selects a protection icon 142. Selection of relevant time slots may be constrained by certain rules as described in further detail herein.

Figure 5:
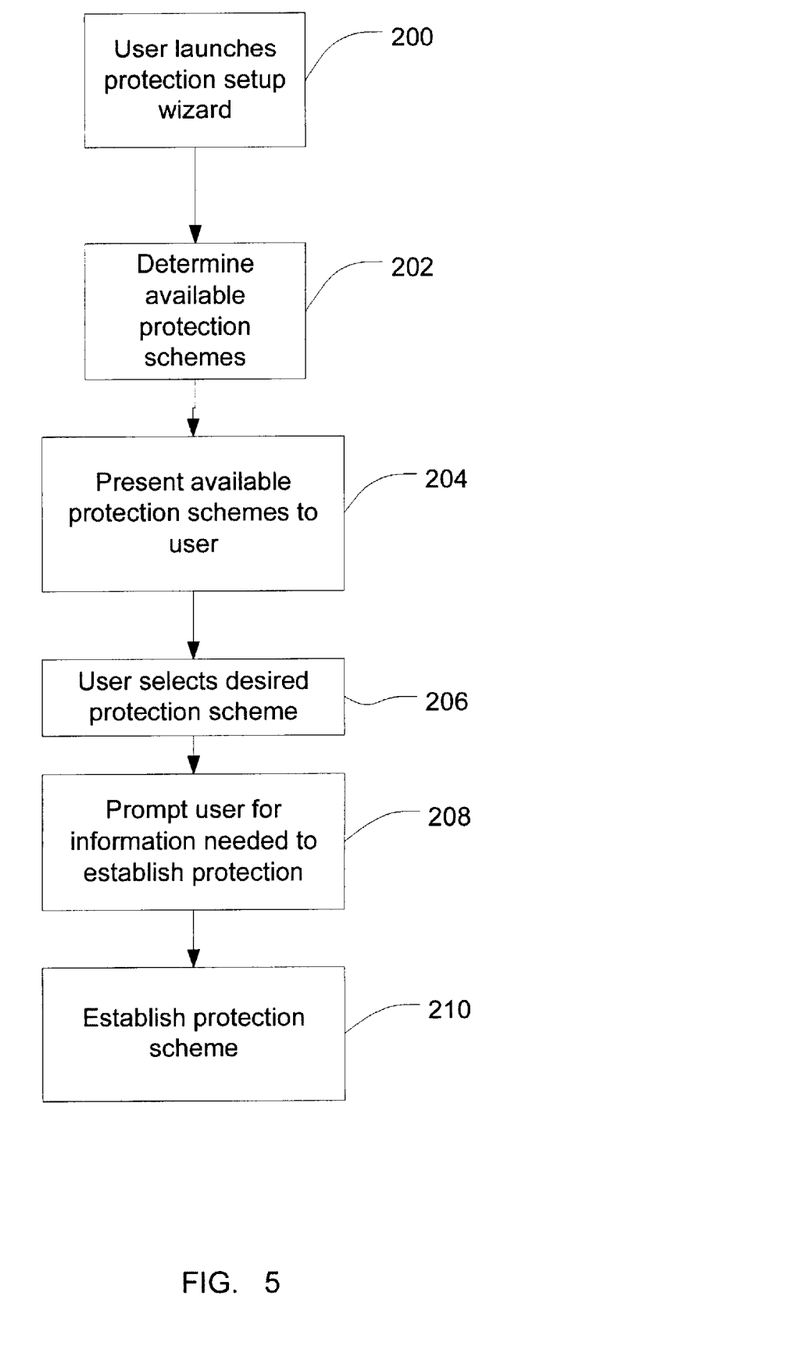
FIG. 5 is a flowchart of an exemplary process for establishing a protection scheme.

When a user selects a protection tool icon 142, the user interface application launches a protection setup wizard that allows the user to specify a protection scheme. FIG. 5 is a flowchart of an exemplary protection setup process. The process begins at step 200 when the user launches the protection setup wizard. At step 202, the user system 30 obtains the type of protection schemes available for the equipment installed in cross connect 20. Certain equipment or circuit packs typically support certain types of protection schemes (e.g., linear 1+1, BLSR, etc). The user system 30 may determine the available protection schemes by accessing a database in storage medium 31. The user system 30 identifies the type of equipment in cross connect 20 by accessing memory device 28. The user system 30 then retrieves the available protection schemes from the database and presents the available protection schemes to the user at step 204.

Alternatively, memory device 28 in cross connect 20 may contain a list of available protection schemes for cross connect 20. This information may be transferred to user system 30 upon a request from user system 30. This eliminates the need for user system 30 to maintain a database of available protection schemes in storage medium 31.

The user selects the desired protection scheme from the available protection schemes at step 206 and at step 208, the user system requests information needed to establish the protection scheme from the user. This may entail the user identifying ports and/or time slots that are to serve as protection paths for the selected time slots along with other protection scheme-specific information.

At step 210, the user system 30 establishes the protection scheme for the selected time slots. This includes associating the protection scheme with the selected time slots such that when a connection is subsequently established using one or more of the selected time slots, the user system 30 automatically provisions the protection path in cross connect 20.

Add/drop connection icon 144, hairpin connection icon 146 and pass though connection icon 148 allow a user to create these types of connections. To establish an add/drop connection, the user selects one or more time slots from a line port, one or more time slots from a tributary port and selects the add/drop icon 144. To establish a hairpin connection, the user selects one or more time slots from a tributary port, one or more time slots from another tributary port and selects the hairpin icon 146. To establish a pass through connection, the user selects one or more time slots from a line port, one or more time slots from another line port and selects the pass through icon 148.

If any of the add/drop, hairpin or pass through time slots selected by the user are associated with a protection scheme, the user system 30 automatically provisions the protection connection when the user defines the working connection. The protection connection is shown in the user interface with, for example, a dashed line. This facilitates creation of protection connections and requires no input from the user once the overall protection scheme has been established.

To assign enhanced, non-preemptible, unprotected traffic (E-NUT), the user selects one or more time slots from a line port or a tributary port and selects the E-NUT icon 150. The user system 30 automatically creates the ENUT timeslot markings on all the appropriate ports. Depending on rules and/or user selection all the appropriate timeslots on all the affected ports are marked as un-switched.

The processes of defining protection schemes and establishing add/drop, pass through, hairpin and ENUT connections include the user selecting time slots. This may be performed by a user operating an input device such as a mouse or keyboard. The selection of time slots may be controlled by one or more time slot selection rules imposed by the user interface application.

In general, the time slot selection rules control the time slots that may be selected based on a variety of rules. For example, if the cross connect is used for SONET transmissions, time slots may only be selected in groups of 1, 3, 12, 48 or 192 corresponding to SONET data rates. If a user attempts to select 4 time slots, the user system 30 automatically increases this selection to 12 time slots. Another exemplary time slot selection rule allows the user to select any number of time slots if a port is configured for virtual concatenation in which an arbitrary number of time slots may be used to make up a frame. Alternatively, if a port is configured for transparent operation, a selection of any number of time slots will automatically be expanded to encompass all time slots for that port. It is understood that other time slot selection rules may be applied by the user system 30 to control time slot selection by the user.

The applicable time slot selection rules may be determined by the user system 30 in response to the type of equipment in the cross connect and/or the mode of operation of the equipment. The user system 30 communicates with processor 26 in cross connect 20 to determine the type of equipment and/or the mode of operation of equipment in cross connect 20. The user system 30 establishes the time slot selection rules based on the type of equipment and mode of operation of equipment. The time slot selection rules may be stored in storage medium 31 indexed by equipment type and mode of operation. Alternatively, the time slot selection rules may be stored in cross connect memory device 28 and transferred to user system 30 upon request.

Figure 6:
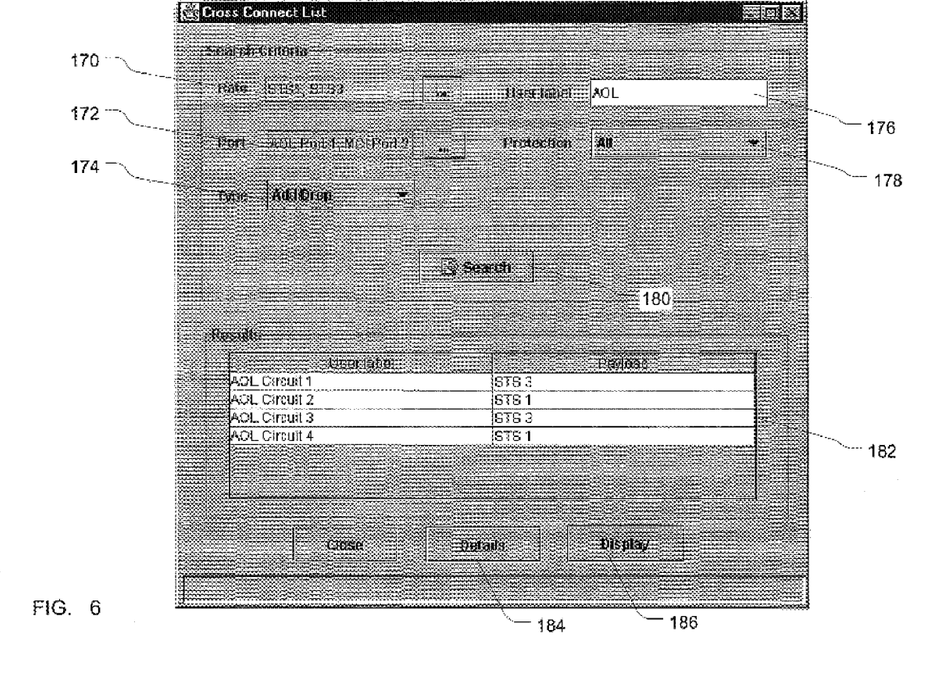
FIG. 6 depicts an exemplary cross connection search interface.

The user interface application also provides search tools for retrieving information about connections. A cross connect search is implemented when the user selects a cross connect search icon 152. FIG. 6 depicts an exemplary cross connect search interface presented on user system 30. The cross connect search interface includes a number of search fields that allow a user to specify one or more search criteria. A rate search field 170 allows a user to search for cross connections based on data rate. The rate search field 170 may be associated with a drop down menu that allows a user to select rates from a predefined list.

A port search field 172 allows a user to search for cross connections based on port identifiers. The port search field 172 may be associated with a drop down menu that allows a user to select port identifiers from a predefined list. The port identifiers may be assigned by users when connections are provisioned, altered, etc.

A connection type search field 174 allows a user to search for cross connections based on the type of connection. As described previously, connections may be provisioned as add/drop, hairpin and pass through. The connection type search field 174 may be associated with a drop down menu that allows a user to select connection types from a predefined list.

A connection label search field 176 allows a user to search for connections based on user-assigned labels. The user-assigned labels may be assigned by users when connections are provisioned, altered, etc.

A protection type search field 178 allows a user to search for connections based on the type of protection provided for a connection. As described previously, protection schemes may be assigned to connections using the protection setup wizard. The protection type search field 178 may be associated with a drop down menu that allows a user to select protection types from a predefined list. The different types of protection used may be stored in storage medium 31 to populate the drop down list.

Once the user has entered search criteria in one or more search fields, the user selects the search icon 180 to initiate the cross connection search. User system 30 searches a database of cross connections stored in storage medium 31 for cross connections meeting the search criteria. As described above, cross connect configuration data from memory device 28 may be copied into storage medium 31. The cross connect configuration data includes connection rates, port identifiers, connection type, connection labels and protection types. The user system 30 retrieves connections meeting the search criteria.

The retrieved cross connections are presented in a results table 182. The user can retrieve detailed information concerning the cross connections in result table 182 by selecting a detail icon 184. This causes the user interface application to retrieve information concerning retrieved cross connections from storage medium 31 and display the detailed information to the user.

The user may also select a display icon 186 to view a retrieved cross connection from the result table in a graphical format such as that shown in FIG. 4. The user system 30 determines the suitable slice level and granularity so that the connection can be effectively displayed. For example, if the cross connection has an OC-192 level, the slice level may be set to 192 and the granularity 48 so that the entire cross connection can be displayed. The retrieved cross connection may be shown along with other cross connections between the same ports. The retrieved cross connection may be designated by a connection line having a different color or a different format (e.g., dotted line).

Figure 7:
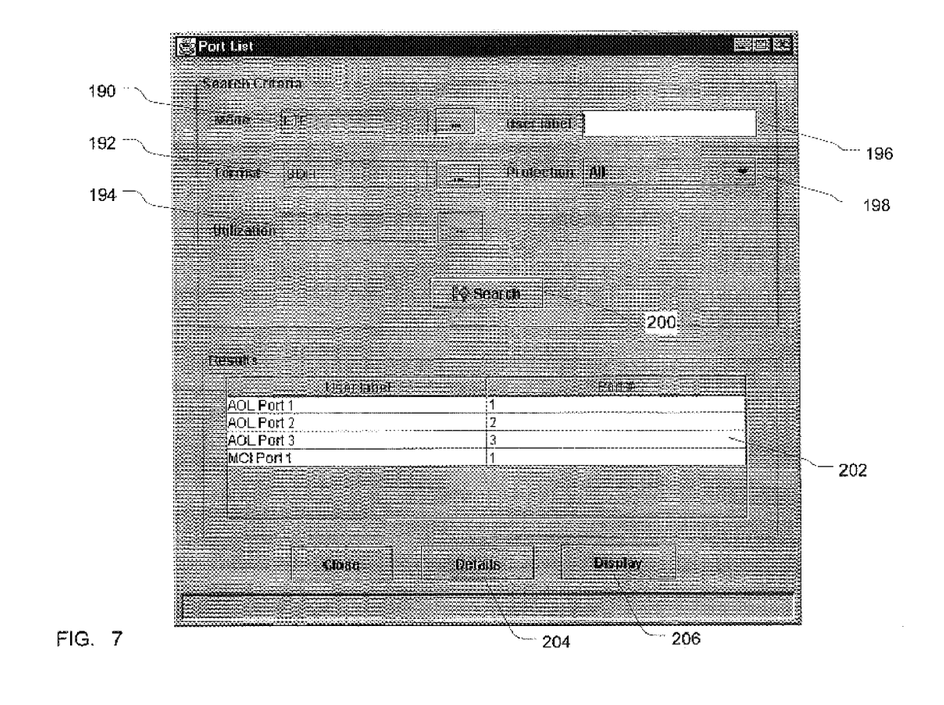
FIG. 7 depicts an exemplary port search interface.

The user system also provides a port search tool that is implemented when the user selects a port search icon 154. FIG. 7 depicts an exemplary port search interface presented on user system 30. The port search interface includes a number of search fields that allow a user to specify one or more search criteria. A transparency mode search field 190 allows a user to search for ports based on the transparency mode of a port (e.g., partially transparent, fully transparent, line terminating equipment). The mode search field 190 may be associated with a drop down menu that allows a user to select transparency modes from a predefined list.

A transmission format search field 192 allows a user to search ports based on transmission format (e.g., SONET, SDH). The transmission format search field 192 may be associated with a drop down menu that allows a user to select transmission formats from a predefined list.

A utilization search field 194 allows a user to search for ports based on utilization of the port. The utilization of a port may be defined in a number of ways. For example, the utilization may be represented by time slots allocated to connections either as a total number or a percentage of all time slots (e.g., 96 time slots or 50%). Alternatively, utilization may be represented by available time slots, available contiguous time slots or percentage of available time slots.

A port label search field 196 allows a user to search for ports based on user-assigned port labels. The user-assigned labels may be assigned by users when ports are established.

A protection type search field 198 allows a user to search for ports based on the type of protection provided for a port. As described previously, protection schemes may be assigned to connections through ports using the protection setup wizard. The protection type search field 198 may be associated with a drop down menu that allows a user to select protection types from a predefined list. The different types of protection used may be stored in storage medium 31 to populate the drop down list.

Once the user has entered search criteria in one or more search fields, the user selects the search icon 200 to initiate the port search. User system 30 searches a database of ports stored in storage medium 31 for ports meeting the search criteria. As described above, port configuration data from memory device 28 may be copied into storage medium 31. The port configuration data includes transparency mode, transmission format, utilization, port labels and protection types for all ports. The user system 30 retrieves ports meeting the port search criteria.

The retrieved ports are presented in a port results table 202. The user can retrieve detailed information concerning the ports in port result table 202 by selecting a detail icon 204. This causes the user system 30 to retrieve information concerning retrieved ports from storage medium 31 and display the detailed information to the user.

The user may also select a display icon 206 to view a retrieved port from the port result table 202 in a graphical format such as that shown in FIG. 4. The port would be graphically distinguished from other ports (e.g., highlighted with color).

Figure 8:
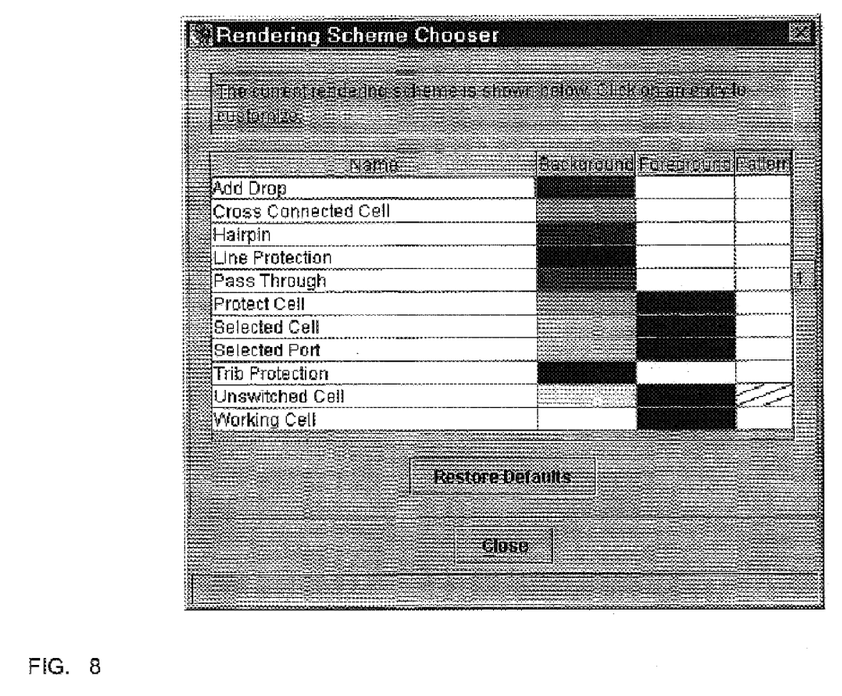
FIG. 8 is an exemplary rendering scheme selection interface.

The user system 30 allows a user to define the format of graphical representations in the user interface. Upon selection of a legend icon 155 (FIG. 4), the user is presented with a rendering scheme selection screen such as that shown in FIG. 8. The rendering scheme selection screen allows a user to define the graphical appearance of different components of the user interface and customize the appearance of the components. Exemplary components are listed in FIG. 8 and it is understood that the graphical appearance of other components may be controlled through the rendering scheme selection screen.

Figure 9:
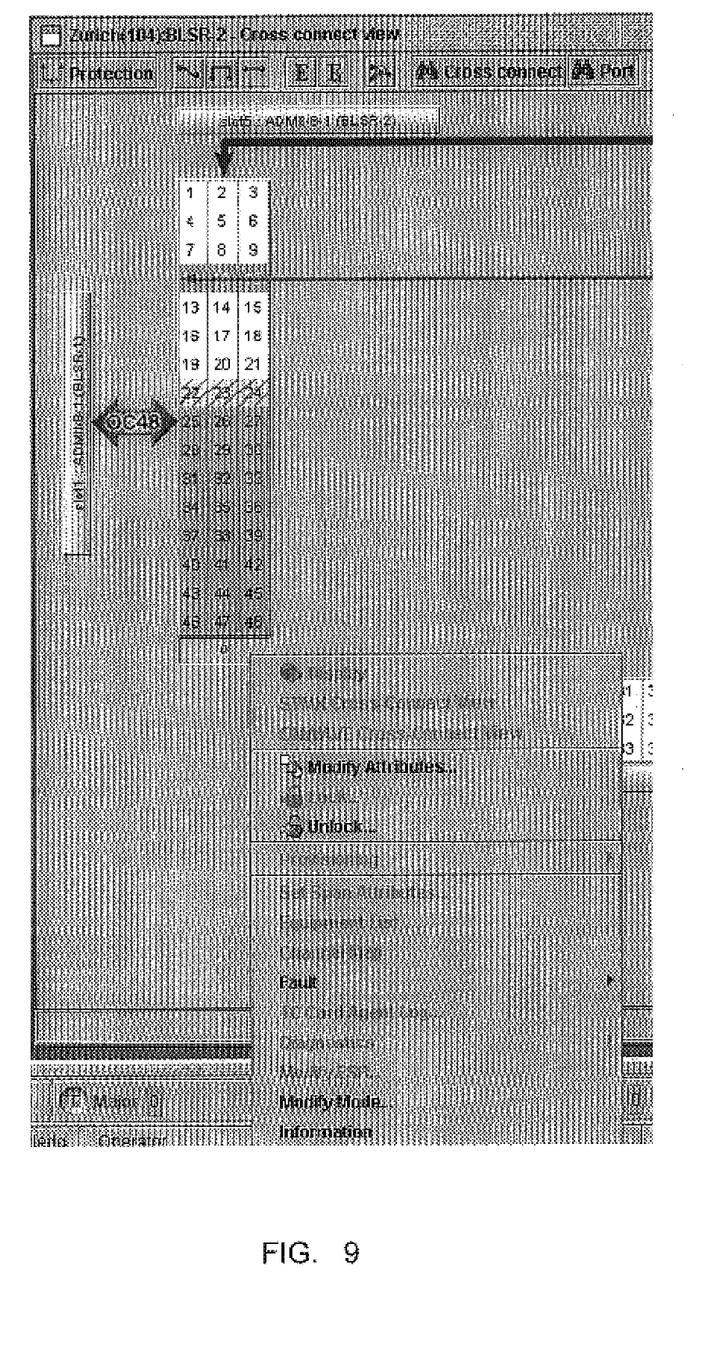
FIG. 9 depicts an exemplary port operation window.

Referring to the user interface in FIG. 4, each set of line time slots includes a line port identifier 121. Similarly, each set of tributary time slots includes a tributary port identifier 125. The user system 30 allows the user to access port operations by selecting the line port identifier 121 or the tributary port identifier 125. FIG. 9 shows an exemplary line port operation window launched by the user interface application when a user selects (e.g., right clicks) a line port identifier 121. The line port operation window provides the user with access to various line port operations. A similar tributary port operation window may be launched upon selecting tributary port identifier 125. A circuit pack operation window may be launched upon selecting circuit indicators 123 or 127.

The user interface application may access other tools related to communication network 10. For example, the user interface application implemented on user system 30 may include a button to launch a channel mapping user interface that maps time slot allocations across multiple nodes in communication network 10. Such a channel mapping user interface is described in co-pending U.S. patent application filed concurrently herewith, referenced as attorney docket number 04-670. The cross connection user interface described herein and related tools may use a common rendering scheme established through the rendering scheme selection screen shown in FIG. 8. This provides a consistent look across multiple tools.

As described above, the user interface application is implemented on a processor-based, user system. Thus, the invention may be embodied in the form of a computer program code including instructions embodied in tangible media, such as floppy diskettes, CD-ROMs, hard drives, memory or any other computer-readable storage medium, wherein, when the computer program code is loaded into and executed by a processor, the processor becomes an apparatus for practicing an embodiment of the invention. Also included may be embodiments in the form of computer program code, for example, whether stored in a storage medium, loaded into and/or executed by a processor, or as a data signal transmitted, whether a modulated carrier wave or not, over some transmission medium, such as over electrical wiring or cabling, through fiber optics, or via electromagnetic radiation, wherein, when the computer program code is loaded into and executed by a processor, the processor becomes an apparatus for practicing the embodiment of the invention. When implemented on a general-purpose microprocessor, the computer program code segments configure the microprocessor to create specific logic circuits.

Embodiments of the invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A method for managing connections in a cross connect of a communication network, the connections carrying time division multiplexed signals having a number of time slots, the method comprising:
   displaying connections in the cross connect at a coarse level, the coarse level having a slice level corresponding to a number of time slots displayed and a granularity corresponding to a time slot resolution; and
   displaying connections in the cross connect at a fine level, the fine level having a further slice level corresponding to a number of time slots displayed and a further granularity corresponding to a time slot resolution, the further granularity being less than the granularity in the coarse level.

2. The method of claim 1 further comprising:
   receiving a user selection of at least one time slot; and
   altering the user selection of the at least one time slot in response to a time slot selection rule.

3. The method of claim 2 wherein:
   said altering the user selection of the at least one time slot includes increasing a number of selected time slots to a predefined value.

4. The method of claim 3 wherein:
   the predefined value corresponds to a standard transmission rate.

5. The method of claim 2 further comprising:
   obtaining cross connect configuration data from the cross connect; and
   establishing the time slot selection rule in response to the cross connect configuration data.

6. The method of claim 1 wherein:
   said displaying connections in at least one of the coarse level and the fine level includes displaying line port time slots at a first position and displaying tributary port time slots at a second position.

7. The method of claim 6 wherein:
   said displaying connections in at least one of the coarse level and the fine level includes displaying a pass through connection as a line connecting a first line port time slot and a second line port time slot.

8. The method of claim 6 wherein:
   said displaying connections in at least one of the coarse level and the fine level includes an add-drop connection as a line connecting a line port time slot and a tributary port time slot.

9. The method of claim 6 wherein:
   said displaying connections in at least one of the coarse level and the fine level includes displaying a hairpin connection as a line connecting a first tributary port time slot and a second tributary port time slot.

10. The method of claim 1 wherein:
    said displaying connections in at least one of the coarse level and the fine level includes displaying protection lines corresponding to protection connections, the protection lines being distinguished from the connections.

11. The method of claim 10 wherein:
    said displaying protection lines includes displaying a protection scheme corresponding to the protection connection.

12. The method of claim 1 wherein:
    said displaying connections in at least one of the coarse level and the fine level includes displaying connection lines having a format that varies with data rate of the connection.

13. The method of claim 1 wherein:
    said displaying connections in at least one of the coarse level and the fine level includes graphically grouping time slots corresponding to a single connection.

14. The method of claim 1 wherein:
    said displaying connections in at least one of the coarse level and the fine level includes display a circuit pack indicator designating a circuit pack establishing the connection.

15. The method of claim 1 further comprising:
    receiving search criteria from a user;
    retrieving from a database connections matching the search criteria to define retrieved connections;
    receiving a request from the user to display at least one of the retrieved connections;
    determining a slice level corresponding to a number of time slots displayed and a granularity corresponding to a time slot resolution; and
    displaying at least one of the retrieved connections using the slice level and the granularity.

16. The method of claim 15 wherein:
    said displaying includes highlighting the at least one retrieved connection.

17. The method of claim 1 further comprising:
    receiving a request to establish protection scheme;
    determining at least one type of equipment in the cross connect;
    determining available protection schemes in response to the at least one type of equipment in the cross connect;
    prompting a user to select one of the available protection schemes to define a selected protection scheme;
    obtaining information to establish the selected protection scheme; and
    displaying the selected protection scheme in the cross connect.

18. The method of claim 17 further comprising:
    receiving a request to establish a connection in the cross connect; and
    automatically establishing a protection connection in the cross connect in response to creation of the connection and the selected protection scheme.

19. A system for managing connections in a communication network carrying time division multiplexed signals having a number of time slots, the system comprising:
    a cross connect for establishing connections;

a user system coupled to said cross connect and in communication with said cross connect, said user system implementing a user interface for:

displaying connections in the cross connect at a coarse level, the coarse level having a slice level corresponding to a number of time slots displayed and a granularity corresponding to a time slot resolution; and     displaying connections in the cross connect at a fine level, the fine level having a further slice level corresponding to a number of time slots displayed and a further granularity corresponding to a time slot resolution, the further granularity being less than the granularity in the coarse level.

20. The system of claim 19 wherein:

said user system receives a user selection of at least one time slot; and said user system alters the user selection of the at least one time slot in response to a time slot selection rule.

21. The system of claim 20 wherein:

the altering of the user selection of at least one time slot includes increasing a number of selected time slots to a predefined value.

22. The system of claim 21 wherein:

the predefined value corresponds to a standard transmission rate.

23. The system of claim 20 wherein:

said user system obtains cross connect configuration data from the cross connect; and said user system establishes the time slot selection rule in response to the cross connect configuration data.

24. The system of claim 19 wherein:

said user system displaying connections in at least one of the coarse level and the fine level includes displaying line port time slots at a first position and displaying tributary port time slots at a second position.

25. The system of claim 24 wherein:

said user system displaying connections in at least one of the coarse level and the fine level includes displaying a pass through connection as a line connecting a first line port time slot and a second line port time slot.

26. The system of claim 24 wherein:

said user system displaying connections in at least one of the coarse level and the fine level includes an add-drop connection as a line connecting a line port time slot and a tributary port time slot.

27. The system of claim 24 wherein:

said user system displaying connections in at least one of the coarse level and the fine level includes displaying a hairpin connection as a line connecting a first tributary port time slot and a second tributary port time slot.

28. The system of claim 19 wherein:

said user system displaying connections in at least one of the coarse level and the fine level includes displaying protection lines corresponding to protection connections, the protection lines being distinguished from the connections.

29. The system of claim 28 wherein:

said user system displaying protection lines includes displaying a protection scheme corresponding to the protection connection.

30. The system of claim 19 wherein:

said user system displaying connections in at least one of the coarse level and the fine level includes displaying connection lines having a format that varies with data rate of the connection.

31. The system of claim 19 wherein:

said user system displaying connections in at least one of the coarse level and the fine level includes graphically grouping time slots corresponding to a single connection.

32. The system of claim 19 wherein:

said user system displaying connections in at least one of the coarse level and the fine level includes display a circuit pack indicator designating a circuit pack establishing the connection.

* * * * *